Oct. 25, 1966  E. CAPUCIO  3,281,295
METHOD OF CAPPING
Filed Aug. 25, 1964  4 Sheets-Sheet 1
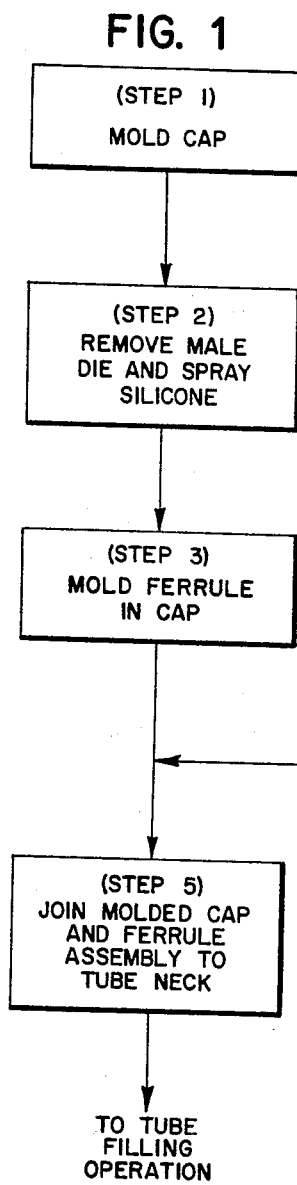
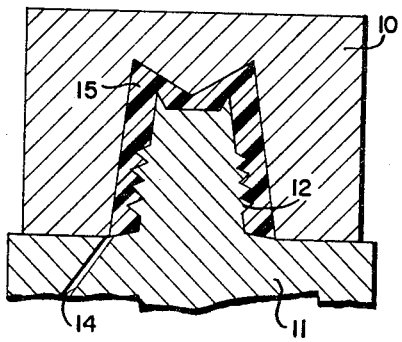
FIG. 2
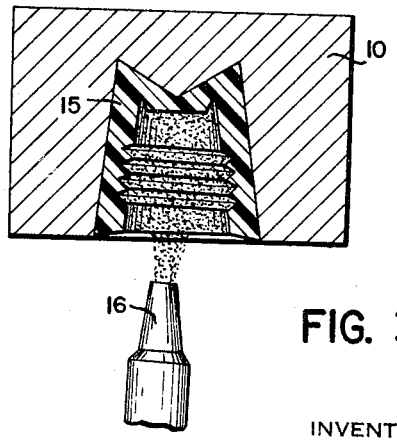
FIG. 3
INVENTOR
EUGENE CAPUCIO
BY
ATTORNEYS Oct. 25, 1966    E. CAPUCIO    3,281,295
METHOD OF CAPPING Filed Aug. 25, 1964    4 Sheets-Sheet 2

INVENTOR
EUGENE CAPUCIO
BY
ATTORNEYS

Oct. 25, 1966  E. CAPUCIO  3,281,295
METHOD OF CAPPING
Filed Aug. 25, 1964  4 Sheets-Sheet 3
FIG. 7
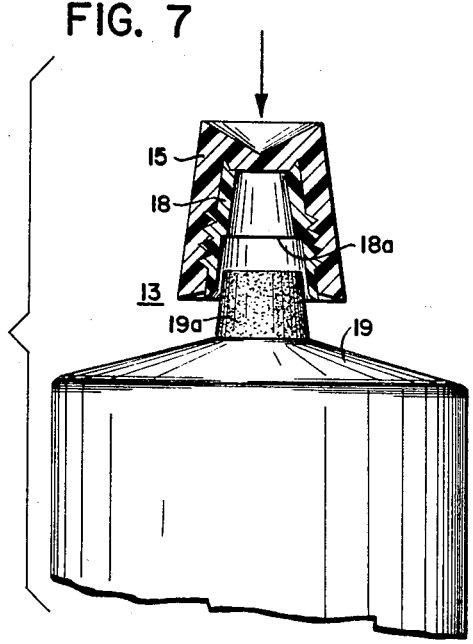
FIG. 8
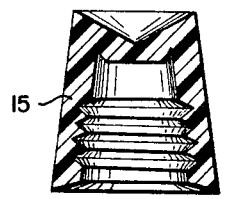
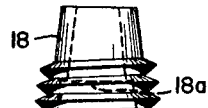
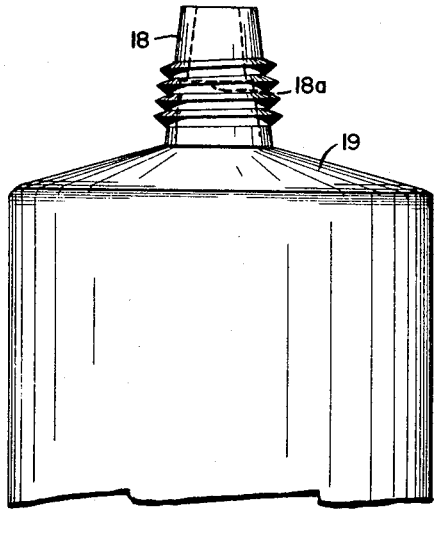
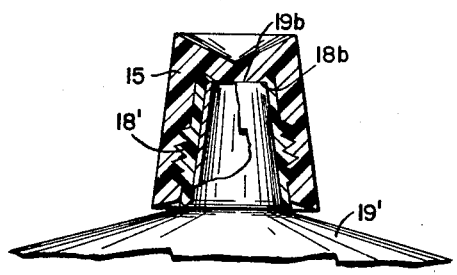
FIG. 9
INVENTOR
EUGENE CAPUCIO
BY
ATTORNEYS Oct. 25, 1966    E. CAPUCIO    3,281,295
METHOD OF CAPPING
Filed Aug. 25, 1964    4 Sheets-Sheet 4

INVENTOR
Eugene Capucio
BY
Pennie, Edmonds, Morton, Taylor & Adams
ATTORNEYS

United States Patent Office 3,281,295
Patented Oct. 25, 1966

3,281,295
METHOD OF CAPPING
Eugene Capucio, Apartado 1087, Caracas, Venezuela
Filed Aug. 25, 1964, Ser. No. 393,478
9 Claims. (Cl. 156—69)

The present application is a continuation-in-part of my copending application, Serial No. 200,882, filed June 7, 1962, entitled Method of Capping Containers and now abandoned.

This invention relates generally to container closures and more particularly to a novel method of manufacturing cap closures, the product of the manufacturing method, and the method of affixing said caps to containers.

Conventional methods for capping containers such as toothpaste tubes, for example, generally require that the neck of the tube container be externally threaded or in the alternative that a separate threaded neck be attached to the tube. Thereafter, a threaded cap is screwed onto the neck to form a completed closure of the tube. The foregoing assembly operations are generally completed by automatic machinery on a production basis; however, the cap-screwing operation is subject to serious difficulties due to inherent limitations in present automatic assembly apparatus. By way of example, it is often difficult to thread a cap manually to a tube, since proper starting engagement of the threads and axial alignment of the cap and neck are essential prerequisites to success. Accordingly it is not surprising that in automated production assembly, the cap screwing operation regularly presents a problem due to malfunction, thereby requiring the rejection of caps and/or containers which have been damaged and a follow-up operation wherein the capping operation is effected manually.

In accordance with the present invention, I have devised a method of making a cap product and a container capping method which entirely eliminates the need for the aforementioned cap screwing operation and thus avoids the difficulties attendant therewith. A further advantage is that the present method completely eliminates any threading of the tube neck. In accordance with one embodiment of my method, a closure cap is first molded with internal threads in the conventional manner, preferably of a heat moldable plastic. Next, the internal male portion of the cap molding die is removed and the interior of the cap is coated with a releasing agent which will inhibit the bonding or fusing of plastic to the interior of the cap during a succeeding molding operation. Such an agent may be, for example, a silicone spray. Thereafter, a second male die is located axially within the cap and an externally threaded ferrule is molded using the surrounding previously formed plastic cap as a female die. The plastic material used to form the threaded ferrule preferably has a lower fusing temperature than the plastic used to form the cap so that fusion of the cap and ferrule is prevented. Fusion is further inhibited by the use of the silicone spray coating which is applied to the interior of the cap prior to molding of the ferrule therein.

In an alternative embodiment of my invention, the basic principle of using one of the molded parts of the intended assembly as a die for producing the remaining part is employed; however, the procedure is modified to the extent that the first molding is of the ferrule with external threads. After the ferrule is formed, it together with the internal ferrule molding die is removed and the exterior of the ferrule is coated with a releasing agent. Next the ferrule with the internal molding die still attached is positioned in a female cap molding die and the internally threaded cap is molded using the internally positioned ferrule as a male die. In this embodiment of my invention the material used to form the cap preferably has a lower fusing temperature than the material used to form the ferrule so that fusion of cap and ferrule is prevented.

Following a satisfactory cooling period, the male die used during the second molding operation of either embodiment is removed leaving the cap and ferrule assembly threaded together so that they form an integral cap closure unit. The ferrule is molded to have an internal surface proportioned to receive and mate with the elongated neck of a container tube which is to be capped by the closure unit.

In the capping operation, the integral cap and ferrule assembly is simply pressed onto the mating tube neck and the contacting surfaces are bonded together by conventional bonding techniques. It will be appreciated by those skilled in the art that this capping method completely avoids the troublesome cap screwing assembly operation, it being noted that the cap is first unscrewed from the ferrule and the container by the user who wishes to dispense material therefrom.

Other features and advantages of my invention will be apparent from the following more particular description of preferred embodiments of the invention, as illustrated in the accompanying drawings in which:

FIG. 1 is a block-diagram identifying the several steps included in the capping method provided by my invention;

FIG. 2 shows the conventional molding of a plastic cap;

FIG. 3 illustrates the application of a coating to the interior of the cap;

FIGS. 7 and 8 illustrate respectively the tube and capping closure in partially assembled position and in fully assembled position with the cap removed;

FIG. 9 shows an alternative continued wall ferrule and cap fully assembled to a tube.

Figure 4:
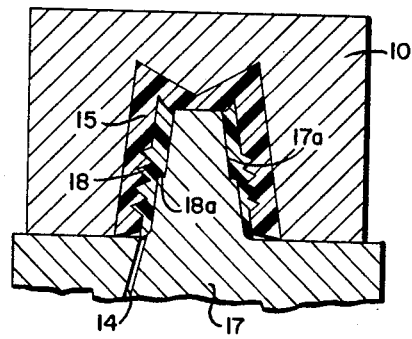
FIGS. 4 and 5 illustrate the steps of molding the ferrule within the molded cap.

Referring now to the drawings, FIG. 1 illustrates sequentially the steps of the capping method provided by the first embodiment of the present invention. The first operation which is performed in carrying out the steps of this embodiment is to mold a tube cap, preferably of a heat-moldable plastic material, in the conventional manner by the use of a die having external female and internal male parts. This operation has been illustrated in FIG. 2 wherein a female die 10 having a generally frusto-conical interior wall surface is shown in fragmentary cross section. The die 10 may be, for example, one of a number of such dies which form part of a molding apparatus for the simultaneous manufacture of a plurality of caps. In accomplishing the cap molding operation, a male die member 11 defining threads 12 on its periphery is inserted axially within its female counterpart 10, thus defining a charge receiving chamber. In the illustrated embodiment, a gate connection 14 is located adjacent to the outer end of the male die 11 for the injection of a heated moldable plastic into the charge member. The molding of the cap is entirely conventional and it is understood that the construction of the die parts 10 and 11 is merely representative since other and equivalent structures (e.g., pressure molding) may be used in accordance with the invention.

After the charge chamber has received the moldable plastic, the latter is permitted to cool and harden and thereafter, the male die 11 is unscrewed from within the cap 15 leaving the latter retained within the female die 10. In certain applications it may be desirable to remove the cap entirely from both die parts, but for purposes of explanatory convenience and illustration, the cap is shown as remaining within the female die 10 throughout the entire molding process.

Referring to FIGS. 1 and 3, the next operation of the method after removal of the male die 11 is to spray the interior wall surfaces of the completed cap 15 with a liquid silicone which will act as a releasing agent, that is, an agent which tends to inhibit adhesion or joining of molten plastcs. This operation has been illustrated schematically by the insertion of a spray nozzle 16 within the cap 15.

Figure 5:
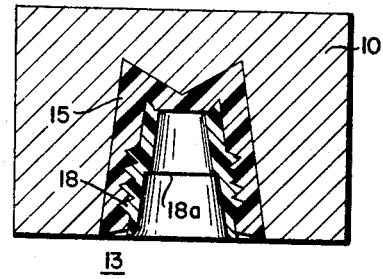

After the spray coating has been applied, the cap 15 serves as a female die for molding a ferrule therein, shown as step 3 of FIG. 1 and more specifically illustrated in FIGS. 4 and 5. In FIG. 4, a male die 17 having an external frusto-conical molding surface 17a, is inserted axially within the molded cap 15. A charge of heated fluid plastic is admitted to the charge chamber between the exterior surface 17a of the male die and the threaded surface of the cap 15 via 14. Advantageously, the plastic used to mold the ferrule 18 is selected to have, as one of its physical characteristics, a lower fusing or liquifying temperature than is characteristic of the plastic of the cap 15. The ferrule is molded at this lower temperature.

This selection of different fusing temperatures for the cap and ferrule coupled with the use of the parting material coating on the interior wall surfaces of the cap 15 inhibits bonding of the ferrule to the cap. Additionally, the plastic of the ferrule is advantageously selected to have a predetermined shrinkage characteristic during cooling such that a desired minimum clearance is maintained between the threads of the ferrule and of the cap after the parts have cooled.

With reference to FIG. 4, it will be seen that the die 17 defines a lower, abutment surface which forms as seen in FIG. 5, an annular shoulder 18a centrally within the ferrule.

After the ferrule 18 has been molded within the cap 15, the male die 17 is withdrawn to leave the completed integral closure unit 13 as shown in FIG. 5 consisting of the cap 15 with the ferrule 18 threaded internally within the cap.

In the alternative embodiment of my invention, the above described molding procedure is rearranged and a ferrule 21 is first formed for subsequent use as the molding die for forming a cap 22.

Figure 10:
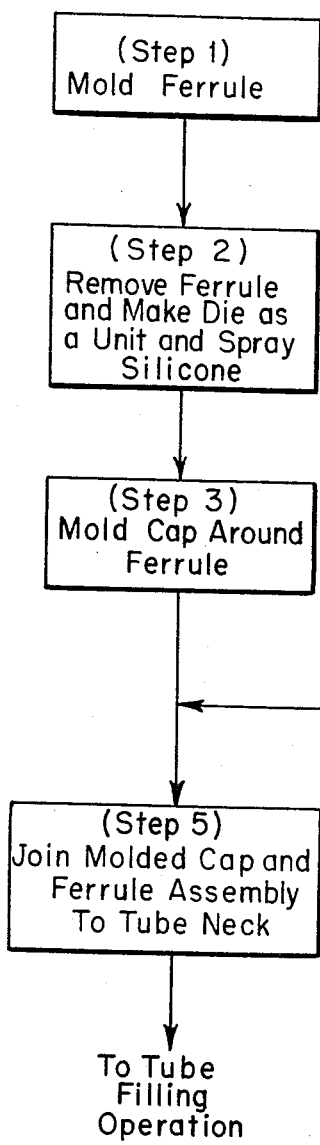
FIG. 10 is a block-diagram identifying the several steps included in an alternative embodiment of the present invention.
Figure 11:
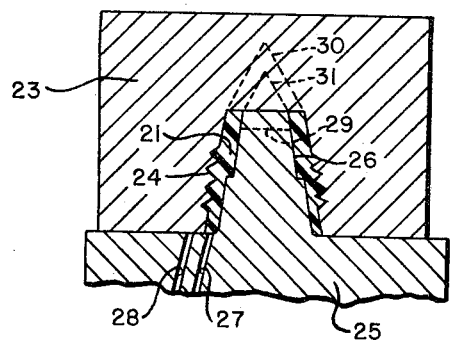
FIG. 11 shows the molding of the ferrule of the assembly in accordance with the alternative embodiment of the present invention.

Referring to FIG. 10, the first step of the molding operation in accordance with this embodiment of my invention is the molding of the ferrule 21. This operation is illustrated in FIG. 11 where a female die 23 having an internally threaded wall surface 24 is shown in fragmentary cross section. In accomplishing the ferrule molding operation, a male die 25 having an external frusto-conical molding surface 26 is inserted axially within its female counterpart 23 thus defining a charge receiving chamber. In this illustrated embodiment, the die 25 is the same as the die 17 except that two gate connections 27 and 28 are located adjacent to the outer end of the die for the introduction of the plastic material. Gate connection 27 is used in molding the ferrule 21 while connection 28 is used in molding the cap 22 as will be described below.

After the charge chamber formed by the dies 23 and 25 has received the moldable plastic, the latter is permitted to cool and harden and thereafter, the male die 25 together with the ferrule 21 is unscrewed from within the female die 23 and the next molding operation is begun. As with the cap formed in the first embodiment of my invention the ferrule may be sprayed exteriorly with liquid silicone before being used in the subsequent molding of the cap.

Figure 12:
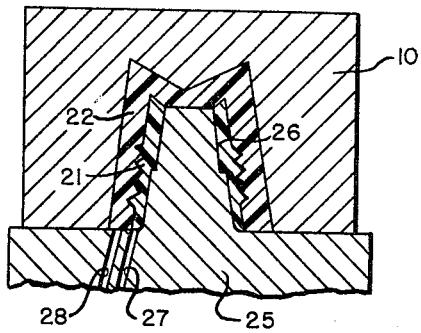
FIG. 12 shows the molding of the cap around the ferrule formed from the mold of FIG. 11.

After the spray coating has been applied, the ferrule 21, serving as the male die as shown in FIG. 12, is inserted axially within a second die 10 which may be the same as the die used in forming the cap 15 of FIG. 2. A charge of heated fluid plastic is then admitted into the charge chamber formed between the exterior surface of the ferrule 21 and cooperating female die 10. The plastic used to mold the cap 22 is selected to have a lower fusing or liquifying temperature than the ferrule 21.

After the cap 22 has been molded around the ferrule 21, the entire assembly including the cap, ferrule and male die is removed from the female die and then the male die 25 is removed from the ferrule to leave a completed closure unit identical in appearance to the unit 13 shown in FIG. 5.

Figure 6:
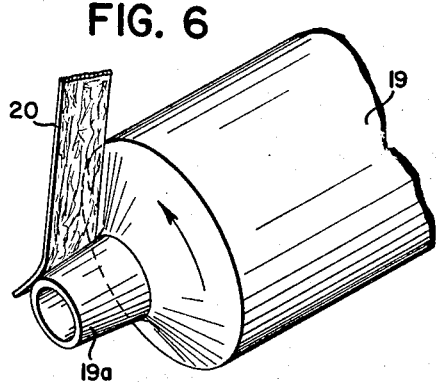
FIG. 6 shows the application of a bonding adhesive to the neck of the tube before capping.

The remaining steps of my capping method are the same for both embodiments of my invention and therefore the following description will be made only with reference to the cap formed from the embodiment of FIG. 1, it being understood that identical steps are included with the second embodiment of my invention as shown in FIG. 10. Referring to FIGS. 1 and 6, the next step is to prepare the elongated neck 19a of the tube 19 to which the closure unit 13 is affixed by applying adhesive thereto. For this purpose I have shown a wick or brush applicator 20 which is maintained saturated with a suitable adhesive. The neck 19a of the tube is brought into contact circumferentially thereof with the applicator 20 by an apparatus (not shown) constructed for this purpose.

Following the application of adhesive to the tube neck 19a, the closure unit 13 is attached to the tube by pressing the central opening in the ferrule down over the neck 19a. (See FIG. 7.) It will be noted that the internal wall surface of the ferrule has been formed to match the shape and size of the neck 19a so that a tight fit will result when the ferrule encompasses the neck. Thus, the neck 19a and ferrule 18 are each of frusto-conical shape defining an included angle of approximately 15° The tapered shape assists in piloting the neck 19a into the ferrule, automatically effecting axial centering of the neck and ferrule.

In the embodiment illustrated in FIGS. 7 and 8, the upper end of the neck abuts the lower surface of the shoulder 18a midway within the ferrule. In the embodiment illustrated in FIG. 9, a shoulder 18b has been formed within the ferrule 18' at the upper end thereof which forms an abutment surface for the upper end of the neck 19b. Otherwise the method of molding and the assembly of the cap and ferrule of FIG. 9 to the tube 19' is the same as has been described in the embodiment illustrated in FIGS. 2–8.

It should be mentioned that since the method of my first embodiment begins with the conventional molding of a tube cap followed by the molding of a ferrule within the cap in threaded engagement therewith, that it may be desirable, for purposes of economy or otherwise, to obtain caps already formed, and then by the use of appropriate apparatus, mold a ferrule therein in the manner described above. Furthermore, the ferrule may be secured to the neck of the container tubes by various other known mechanical bonding techniques. Gaskets may be used within the caps as required.

The method of the present invention is particularly advantageous since it entirely eliminates the cap-screwing operation presently used in the manufacture and assembly of tube closures and also eliminates the necessity of threading the tube neck. Additionally, by using the individual cap or ferrule as a matrix for molding the other member of the assembly to form a unit, there is less opportunity for the cap and its mating threaded connection to the tube (i.e., the threaded ferrule) to be mismatched or inadvertently malformed, which can sometimes occur when the parts are separately manufactured.

It will be understood that the foregoing description is merely representative and relates only to particular embodiments and that various changes can be made. For example, under either embodiment as shown in FIGS. 1 and 10, the ferrule can be produced with an opening at both ends or with one end open and the other end blank and this blank end may be provided with a slot or a small hole, if desired. To produce a blank end, it is simply a matter of spacing the male die 17 or 25 from the bottom of the female die as shown, for example, by the dotted line 29 in FIG. 11. This same procedure can be used in forming the ferrule shown in FIG. 4. Also, as represented in FIG. 11 by the dotted lines 30 and 31, the end of the ferrule 21 can be formed with a nozzle shape which may or may not be provided with an opening at its tip, as desired, by varying the shape of the female die 23 as shown at 30 and the shape of the male die 25 as shown at 31. It is also pointed out that although the above description has been made with reference to plastic materials, the closure parts can be made of metals or plastics, and compositions of the same as well as combinations thereof such as a metal ferrule and a plastic cap. Therefore, in order fully to appreciate the spirit and scope of the invention, reference should be made to the appended claims in which

I claim:
1. The method for capping containers wherein each container has a generally tubular neck for receiving a hollow externally threaded ferrule and a cap threaded to said ferrule to form a closure at one end thereof, comprising molding said cap in a first die which forms the external surface along with threads on the interior wall surface thereof, removing at least that portion of the die which has formed the internal threads, coating the interior surfaces of said cap with a releasing agent, molding said ferrule within said cap by utilizing the cap and the remaining portion of said first die as a female die member in cooperation with a male die disposed internally of said cap, removing said male die and the ferrule and cap from the first die, and fastening said ferrule and cap to a tube by the relative insertion of the neck of said tube into said ferrule.

2. The method of claim 1 in which the cap and ferrule are molded to plastics having respectively different fusing temperatures with that of said cap being higher than that of said ferrule, and said ferrule is molded at a lower temperature than the fusing temperature of said cap.

3. The method of claim 2 in which the neck of said tube is coated with an adhesive prior to the mounting of said ferrule on said neck.

4. The method for capping containers wherein each container has a generally tubular neck for receiving a closure unit having a hollow externally threaded ferrule part and a cap part threaded to said ferrule to form the closure at one end thereof, comprising molding one part of said unit in a first die which forms one surface with threads thereon, removing at least that portion of the die which has formed the threads, coating the threaded surface of said one part with a releasing agent, molding the remaining part of said unit assembled to said one part by utilizing said one part and the remaining portion of said first die as a die member in cooperation with a cooperating die member, removing said cooperating die member and said ferrule and cap unit from said first die, and fastening said ferrule and cap unit to a tube by the relative insertion of the neck of said tube into said ferrule.

5. The method of claim 4 in which the cap part and ferrule part are molded of plastics having respectively different fusing temperatures with that of said one part being higher than that of said remaining part, and said remaining part is molded at a lower temperature than the fusing temperature of said first part.

6. The method of claim 5 in which the neck of said tube is coated with an adhesive prior to the mounting of said ferrule on said neck.

7. The method for capping containers wherein each container has a generally tubular neck for receiving a hollow externally threaded ferrule and a cap threaded to said ferrule to form a closure at one end thereof, comprising molding said ferrule in a first die which forms the internal surface along with threads on the external wall surface thereof, removing at least that portion of the die which has formed the external threads, coating the exterior surface of said ferrule with a releasing agent, molding said cap around said ferrule by utilizing the ferrule and the remaining portion of said first die as a male die member in cooperation with a female die disposed externally of said ferrule, removing said ferrule and cap as a unit from said dies, and fastening said ferrule and cap to a tube by the relative insertion of the neck of said tube into said ferrule.

8. The method of claim 7 in which the cap and ferrule are molded of plastics having respectively different fusing temperatures with that of said ferrule being higher than that of said cap, and said cap is molded at a lower temperature than the fusing temperature of said ferrule.

9. The method of claim 8 in which the neck of said tube is coated with an adhesive prior to the mounting of said ferrule on said neck.

References Cited by the Examiner
UNITED STATES PATENTS

| | | | |
|---|---|---|---|
| 2,347,737 | 5/1944 | Fuller | 264—259 |
| 2,383,230 | 8/1945 | Voke. | |
| 2,398,553 | 4/1946 | Nyden | 215—43 |
| 2,458,885 | 10/1949 | Hooper. | |
| 2,713,369 | 7/1955 | Strahm. | |
| 2,724,863 | 11/1955 | Gudge et al. | |
| 2,732,089 | 1/1956 | Frydlender | 215—43 |
| 2,945,266 | 7/1960 | Mainardi | 264—277 |
| 2,953,815 | 9/1960 | Mainardi. | |
| 3,057,016 | 10/1962 | Schilling | 264—250 |

ROBERT F. WHITE, *Primary Examiner.*

FRANKLIN T. GARRETT, *Examiner.*

ALFRED L. LEAVITT, J. B. MARBERT, L. S. SQUIRES, *Assistant Examiners.*